UNITED STATES PATENT OFFICE.

ERICH RIETZ, OF ELBERFELD, GERMANY, ASSIGNOR TO SYNTHETIC PATENTS CO., INC., OF NEW YORK, N. Y., A CORPORATION OF NEW YORK.

DIACIDYLPYROCATECHIN-ORTHO-CARBOXYLIC-ACID COMPOUND.

1,140,716.  Specification of Letters Patent.  Patented May 25, 1915.

No Drawing.  Application filed October 6, 1914.  Serial No. 865,292.

*To all whom it may concern:*

Be it known that I, ERICH RIETZ, doctor of philosophy, chemist, citizen of the German Empire, residing at Elberfeld, Germany, have invented new and useful Improvements in Diacidylpyrocatechin-Ortho-Carboxylic-Acid Compound, of which the following is a specification.

I have found that new and valuable antipyretics can be obtained by replacing in pyrocatechin-ortho-carboxylic acid compounds having most probably the following general formula:

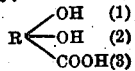

(R standing for an aryl e. g. $C_6H_3\lessgtr$, $C_6H_2CH_3\lessgtr$, the hydrogen atoms of the two OH groups by an acidyl radical e. g. $CH_3$—CO—, $CH_3$—$CH_2$—CO—, etc.) The new products are whitish crystalline substances soluble in the usual organic solvents practically insoluble in water having most probably the following general formula:

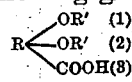

R standing for an aryl; R′ for an acidyl radical.

In order to illustrate the new process more fully the following example is given, the parts being by weight:—300 parts of pyrocatechin-ortho-carboxylic acid are heated during 2 hours to 100–110° C. with 600 parts of acetic acid anhydrid. After cooling the product of the reaction having most probably the formula:

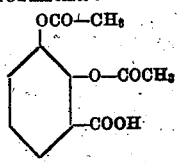

is filtered off and crystallized from alcohol. It is a whitish powder melting at from 148–150° C.

I claim:—

1. The herein described new antipyretics being chemically acidylized pyrocatechin-ortho-carboxylic acid compounds having most probably the following formula:

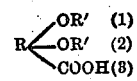

which are whitish crystalline substances soluble in the usual organic solvents, practically insoluble in water, substantially as described.

2. The herein described new antipyretic being chemically diacetyl-pyrocatechin-ortho-carboxylic acid having most probably the formula:

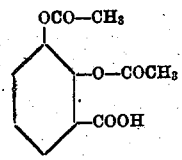

which is a whitish powder of the melting point 148 to 150° C. soluble in the usual organic solvents, practically insoluble in water, substantially as described.

In testimony whereof I have hereunto set my hand in the presence of two subscribing witnesses.

ERICH RIETZ. [L. S.]

Witnesses:
 HELEN NUFER,
 ALBERT NUFER.